(12) United States Patent
Buck

(10) Patent No.: US 11,748,810 B2
(45) Date of Patent: *Sep. 5, 2023

(54) SYSTEM AND METHOD FOR PRIORITIZED AUTOMATED TRADING IN AN ELECTRONIC TRADING ENVIRONMENT

(71) Applicant: TRADING TECHNOLOGIES INTERNATIONAL INC., Chicago, IL (US)

(72) Inventor: Brian J. Buck, Livermore, CA (US)

(73) Assignee: Trading Technologies International, Inc., Chicago, IL (US)

(*) Notice: Subject to any disclaimer, the term of this patent is extended or adjusted under 35 U.S.C. 154(b) by 40 days.

This patent is subject to a terminal disclaimer.

(21) Appl. No.: 17/460,115

(22) Filed: Aug. 27, 2021

(65) Prior Publication Data

US 2021/0390621 A1     Dec. 16, 2021

Related U.S. Application Data

(63) Continuation of application No. 14/195,374, filed on Mar. 3, 2014, now Pat. No. 11,138,659, which is a continuation of application No. 10/950,901, filed on Sep. 27, 2004, now Pat. No. 8,688,562.

(51) Int. Cl.
*G06Q 40/04* (2012.01)
*G06Q 40/06* (2012.01)

(52) U.S. Cl.
CPC ............ *G06Q 40/04* (2013.01); *G06Q 40/06* (2013.01)

(58) Field of Classification Search
None
See application file for complete search history.

(56) References Cited

U.S. PATENT DOCUMENTS

| | | | |
|---|---|---|---|
| 6,507,818 | B1 | 1/2003 | Fishman et al. |
| 6,772,132 | B1 | 8/2004 | Kemp, II et al. |
| 7,113,924 | B2 | 9/2006 | Fishbain |
| 7,127,424 | B2 | 10/2006 | Kemp, II et al. |
| 7,212,999 | B2 | 5/2007 | Friesen et al. |
| 7,389,268 | B1 | 6/2008 | Kemp, II et al. |
| 7,562,038 | B1 | 7/2009 | Brumfield et al. |
| 7,933,830 | B1 | 4/2011 | Buck |
| 8,688,562 | B1 | 4/2014 | Buck |
| 2002/0052821 | A1 | 5/2002 | Terashima |
| 2002/0073014 | A1 | 6/2002 | Gilbert |
| 2002/0107786 | A1 | 8/2002 | Lehmann-Haupt et al. |
| 2002/0165817 | A1 | 11/2002 | Rackson et al. |

(Continued)

OTHER PUBLICATIONS

"The Mouse that Trades," Forbes, Oct. 28, 1991; pp. 1-3.

(Continued)

*Primary Examiner* — Joseph W. King
(74) *Attorney, Agent, or Firm* — McDonnell Boehnen Hulbert & Berghoff LLP

(57) ABSTRACT

A system and method are provided for prioritized automated trading. One example method may include receiving a plurality of parameters, where each parameter has an order-related action associated with a trading strategy, and then detecting one or more events that trigger a plurality of order related actions. The method then includes determining priority levels in relation to a plurality of triggered order-related actions using at least one priority rule, and processing the plurality of triggered order-related action in an order associated with the determined priority levels.

13 Claims, 6 Drawing Sheets

ORDER ROUTING PRIORITY RULES 500
☒ First Registration 502
☐ Random 504
☐ Round Robin 506
☐ Highest Volume Order First 508
☐ Smallest Volume Order First 510
☐ Most Profitable Customer First 512
☐ Calculate All First Then Send 514
☐ Most Recent Fill 516
☐ Least Recent Fill 518
☐ FCM Provided Priority 520
☐ Named-Trader 522
Apply 528
Define Different Rules 524  Further Customize Existing Rules 526

(56) References Cited

U.S. PATENT DOCUMENTS

| | | | |
|---|---|---|---|
| 2003/0033240 | A1 | 2/2003 | Balson et al. |
| 2003/0229563 | A1 | 12/2003 | Moore et al. |
| 2003/0229570 | A1 | 12/2003 | Hughes, Jr. et al. |
| 2003/0233312 | A1 | 12/2003 | Moore et al. |
| 2003/0236737 | A1 | 12/2003 | Kemp, II et al. |
| 2004/0193526 | A1 | 9/2004 | Singer et al. |
| 2005/0165670 | A1 | 7/2005 | Woodmansey et al. |
| 2007/0162373 | A1 | 7/2007 | Kongtcheu |
| 2014/0180902 | A1 | 6/2014 | Buck |

OTHER PUBLICATIONS

Corcella, Karen; "Tomorrow's Tools of the Trade"; Wall Street & Technology, V10, N11; Jun. 1993; pp. 1-5.

Ashok, Kumar; "NSE Vs. BSE; The Bourses Gear up for Fierce Competition as BSE Tries to Regain Lost Ground"; India Today; Jan. 28, 1999; 1-4.

"Compliance Navigator Online Trading"; Financial Net News, V3, N22; Jun. 1, 1998; pp. 1 and 2.

Borgja, Ryan G., "PSE Implements 'Customer First Policy': Business", Manila Bulletin, Aug. 22, 2001.

PR Newswire, Dec. 4, 1986, Thursday.

Brockman and Chung; "Managerial Timing and Corporate Liquidity; Evidence from Actual Share Repurchases," Journal of Financial Economics, Sep. 2001, vol. 61, No. 3.

Stoll, Hans R.; "Market Fragmentation," Financial Analysts Journal, Jul./Aug. 2001, vol. 57, No. 4; p. 16-20.

Benos, Alexandros and Crouhy, Michel; "Changes in the Structure and Dynamics of European Securities Markets", Financial Analysts Journal, May/Jun. 1996, vol. 52, No. 3 p. 37-50.

Chapman, Peter; "A Brave New World of Fees: How a Common Mission Unites Industry Foes." Traders Magazine, 58, Jul. 2002. Retrieved Nov. 9, 2009, from Banking Information Source. (Document ID: 142260891).

Swanson, Steve; "The Winners and Losers In the Reg NMS Stakes: Proposed Rules Rekindle Debates of the 1990s." Traders Magazine, 1, May 2004. Retrieved Nov. 9, 2009, from Banking Information Source. (Document ID: 644780911).

Editorial Staff; "Institutional Order Flow: Eye of the Storm," Security Industry News, Aug. 2004, 6 pgs.

ORDER ROUTING PRIORITY RULES 500

- ☒ First Registration 502
- ☐ Random 504
- ☐ Round Robin 506
- ☐ Highest Volume Order First 508
- ☐ Smallest Volume Order First 510
- ☐ Most Profitable Customer First 512
- ☐ Calculate All First Then Send 514
- ☐ Most Recent Fill 516
- ☐ Least Recent Fill 518
- ☐ FCM Provided Priority 520
- ☐ Named-Trader 522

Define Different Rules 524 | Further Customize Existing Rules 526

Apply 528

FIG. 5

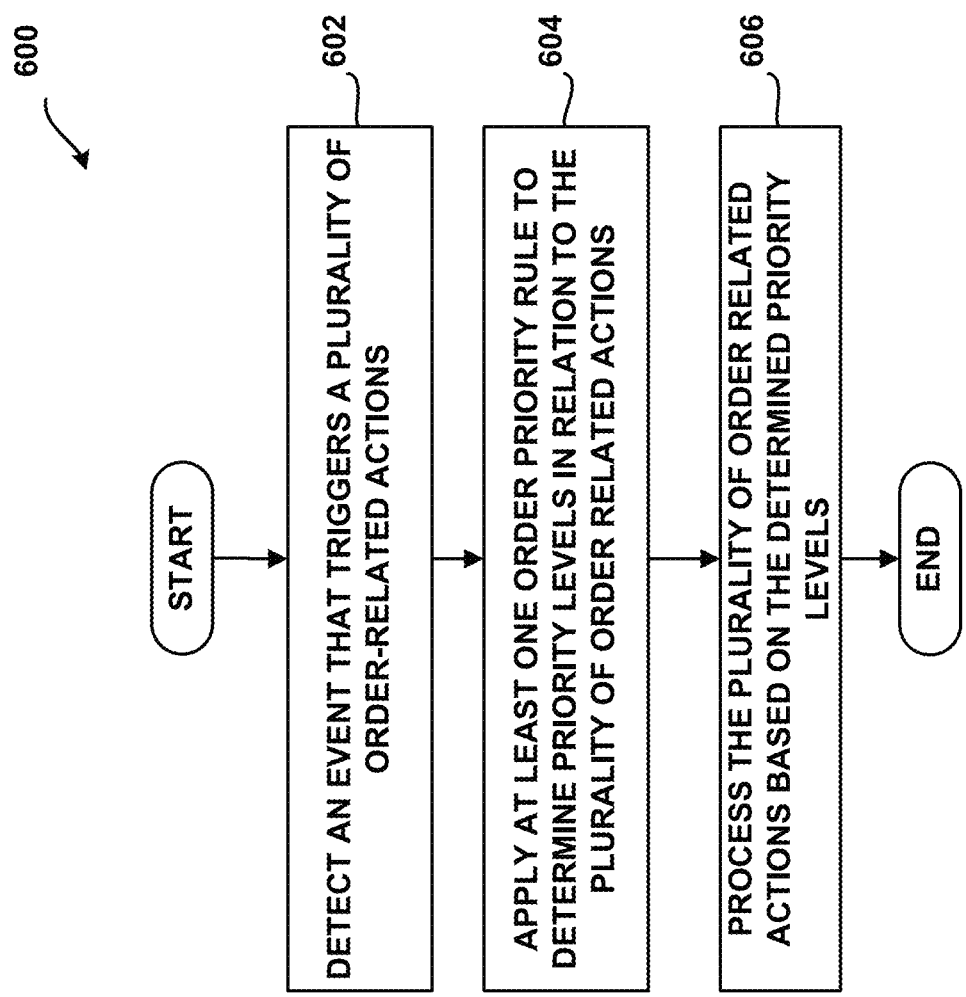

SYSTEM AND METHOD FOR PRIORITIZED AUTOMATED TRADING IN AN ELECTRONIC TRADING ENVIRONMENT

CROSS REFERENCE TO RELATED APPLICATIONS

This application is a continuation of U.S. patent application Ser. No. 14/195,374, filed Mar. 3, 2014, now U.S. Pat. No. 11,138,659, which is a continuation of U.S. patent application Ser. No. 10/950,901, filed Sep. 27, 2004, now U.S. Pat. No. 8,688,562. U.S. patent application Ser. No. 11/415,405, filed May 1, 2006, now U.S. Pat. No. 7,933,830, is also a continuation of U.S. patent application Ser. No. 10/950,901. The contents of each of these applications are fully incorporated herein by reference for all purposes.

TECHNICAL FIELD

The present invention is directed to electronic trading. More specifically, the present invention is directed to prioritized automated trading.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may log onto an electronic exchange trading platform by way of a communication link through their user terminals. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

To profit in today's rapidly moving markets, traders must be able to assimilate and react to enormous amounts of data. For example, a trader may constantly have to review market data, world news, business news, and so on before making trades. Consequently, a skilled trader with the quickest software, the fastest communications, and the most sophisticated analysis can significantly improve the trader's own or potential profits of the trader's firm. The slightest advantage in speed or ability to assimilate information can generate significant returns in a fast moving market. Therefore, in today's fast and dynamically changing markets, a trader lacking those means may be at a disadvantage compared to other traders.

In addition to a standard trading application, traders often use additional programs, such as a separate spreadsheet program, to receive market data feeds and to generate numbers, based on those feeds. The numbers generated by those programs may then be used by a trader to manually enter and execute orders into a trading application. Instead of the manual order entry, some traders use a different approach, with often limited flexibility, by linking a spreadsheet program directly to a trading application. Orders are then automatically entered and executed by the trading application based on the generated numbers. The use of spreadsheets and trading applications in this manner does allow traders to enter orders faster than using traditional methods of order entry and execution.

There are currently existing automated trading applications that run on individual client terminals, and decisions are made on those terminals, (and only those terminals), about what tradeable object and when the selected tradeable object will be traded. In an electronic trading environment, individual client terminals send messages to one or more exchanges, and a trader whose messages arrive first at an exchange is the one whose orders get priority. However, if a client terminal is located far away from an electronic exchange, the network latency will slow down the speed with which an automatically generated request will reach an exchange. Network latency is typically a function of a number of parameters, and the parameters include the speed of communication links, a distance on the networks that have to be traversed, a number of intermediate devices, such as servers, through which communications have to flow, the amount of other load or congestion on the network, and the amount of processing time involved at each intermediate device. Therefore, if a trader's terminal is located far away from an exchange, the network latency may cause some messages to get to an exchange later than messages being sent from a terminal located closer to that exchange. This is especially true when a trader is located on one continent, such as North America, and an exchange is located on another continent, such as Europe, where the difference in network latency involved (due primarily to propagation delay) could be as much as 70-150 milliseconds. Such delays may be especially disadvantageous to traders who run the same automated trading strategy as other traders, but the first group of traders communicates with an exchange using communication links having much higher latency than those being experienced by the second group of traders.

To minimize the latency losses, it would be advantageous to move decision making related to automated trading from a client terminal to one or more centralized network entities that are located closer to exchanges so that the net result would be a faster trading decision. However, when an automatic trading tool runs on a shared server that is used by many traders, the server can only perform one action at a time. Therefore, if the server is to react to changes in the market by sending a plurality of orders to an exchange, the server can send only one order at a time, and thus, a decision has to be made which order should be sent first. Even if a server uses multiple processes or threads and can potentially perform more than one action at a time, but uses one communication link to an exchange, it still will be able to send only one message or request at a time over such a link. Some servers could also communicate with an exchange via more than one connection. However, even if there is more than one communications link between a server and an exchange, some decisions as to what gets sent first will still have to be made since there is no unlimited parallelism.

It is therefore desirable for electronic trading systems to offer tools that can be used for automated trading that is performed at network entity when more than one action is to be taken at the same time based on a trading strategy.

BRIEF DESCRIPTION OF THE FIGURES

Example embodiments of the present invention are described herein with reference to the following drawings, in which:

FIG. 5 is a block diagram illustrating a graphical interface that could be used by a system administrator to select, define, and modify one or more order routing rules to be used by an order routing priority manager at an auto-trader server of the example embodiments; and FIG. 6 is a flow chart illustrating a method for prioritized automated trading using order priority level determination methods according to one example embodiment.

DETAILED DESCRIPTION

I. Server-Based Automated Trading

The preferred embodiments are provided, among other things, to facilitate server-based automated trading based on order priority levels. According to one example method, a plurality of traders may provide their trading strategy profiles to an auto-trader server. The auto-trader server may then use the strategy profiles to detect conditions triggering an action of sending one or more orders, or other order related requests, to an electronic exchange. In one embodiment, the order related requests may include requests to change order related parameters, such as an order quantity or an order cancellation. When the auto-trader server detects that a plurality of orders or other requests are to be simultaneously sent to an electronic exchange, the auto-trader server may apply one or more priority rules to determine a priority level for each order. The priority level assigned to each order may then be used to determine a sequence of sending the orders or requests to the electronic exchange. The example priority rules, as well as different processes that could be used by the auto-trader server to prioritize orders, will be described in greater detail below.

While the example embodiments are described herein with reference to illustrative embodiments for particular applications, it should be understood that the present invention is not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the preferred embodiments are described in a software-based embodiment, which is executed on a computer device. As such, the example embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

Figure 1:
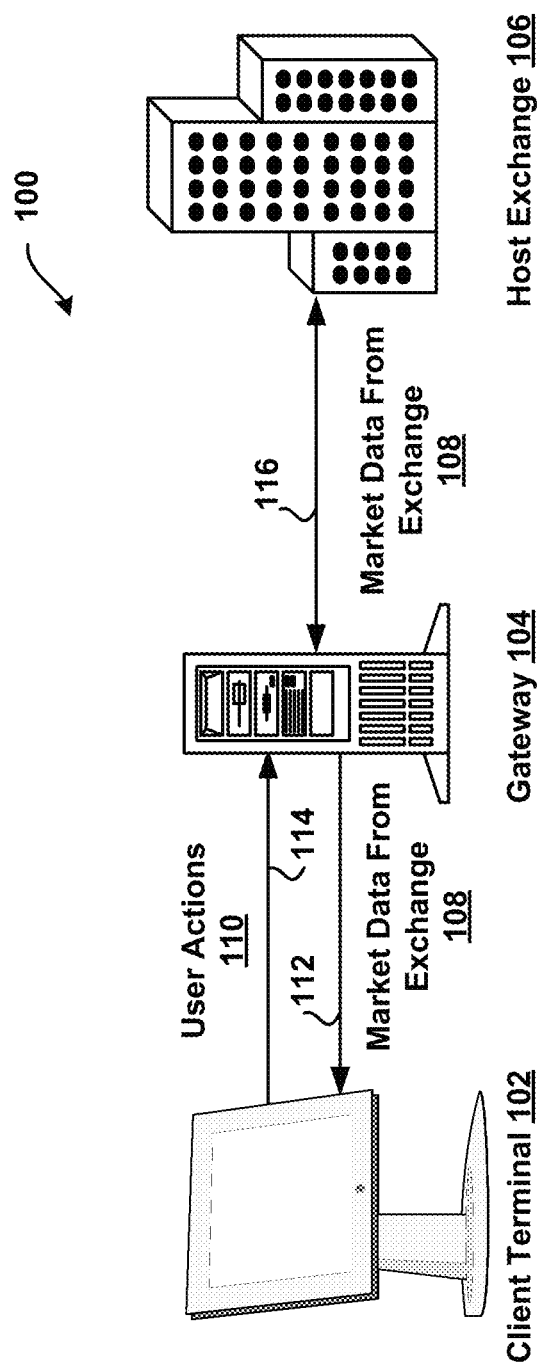
FIG. 1 is a block diagram illustrating an example network configuration for a communication system utilized to access one or more exchanges.

In an electronic trading environment, when a trader selects a tradeable object, the trader may access market data related to the selected tradeable object(s). Referring to FIG. 1, an example communication that might occur between an electronic exchange and a client terminal in accordance with the preferred embodiments is shown. During a trading session, market data 108, in the form of messages, may be relayed from a host exchange 106 over communication links 116 and 112 to a client terminal generally indicated as 102. As illustrated in FIG. 1, intermediate devices, such as gateway(s) 104, may be used to facilitate communications between the client terminal 102 and the host exchange 106. It should be understood that while FIG. 1 illustrates the client terminal 102 communicating with a single host exchange 106, in an alternative embodiment, the client terminal 102 could establish trading sessions to more than one host exchange. Also, it should be understood that information being communicated between the client terminal 102 and the exchange 106 could be communicated via a single communication path.

The market data 108 contains information that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, opening price, last traded price, last traded quantity, closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client terminal 102. Upon viewing the market information or a portion thereof, a trader may wish to take actions, such as send orders to an exchange, cancel orders at the exchange, or change order parameters, for example. To do so, the trader may input various commands or signals into the client terminal 102. Upon receiving one or more commands or signals from the trader, the client terminal 102 may generate messages that reflect the actions taken, generally shown at 110. It should be understood that different types of messages or order types can be submitted to the host exchange 106, all of which may be considered various types of transaction information. Once generated, user action messages 110 may be sent from the client terminal 102 to the host exchange over communication links 114 and 116.

III. System Function and Operation

Figure 2:
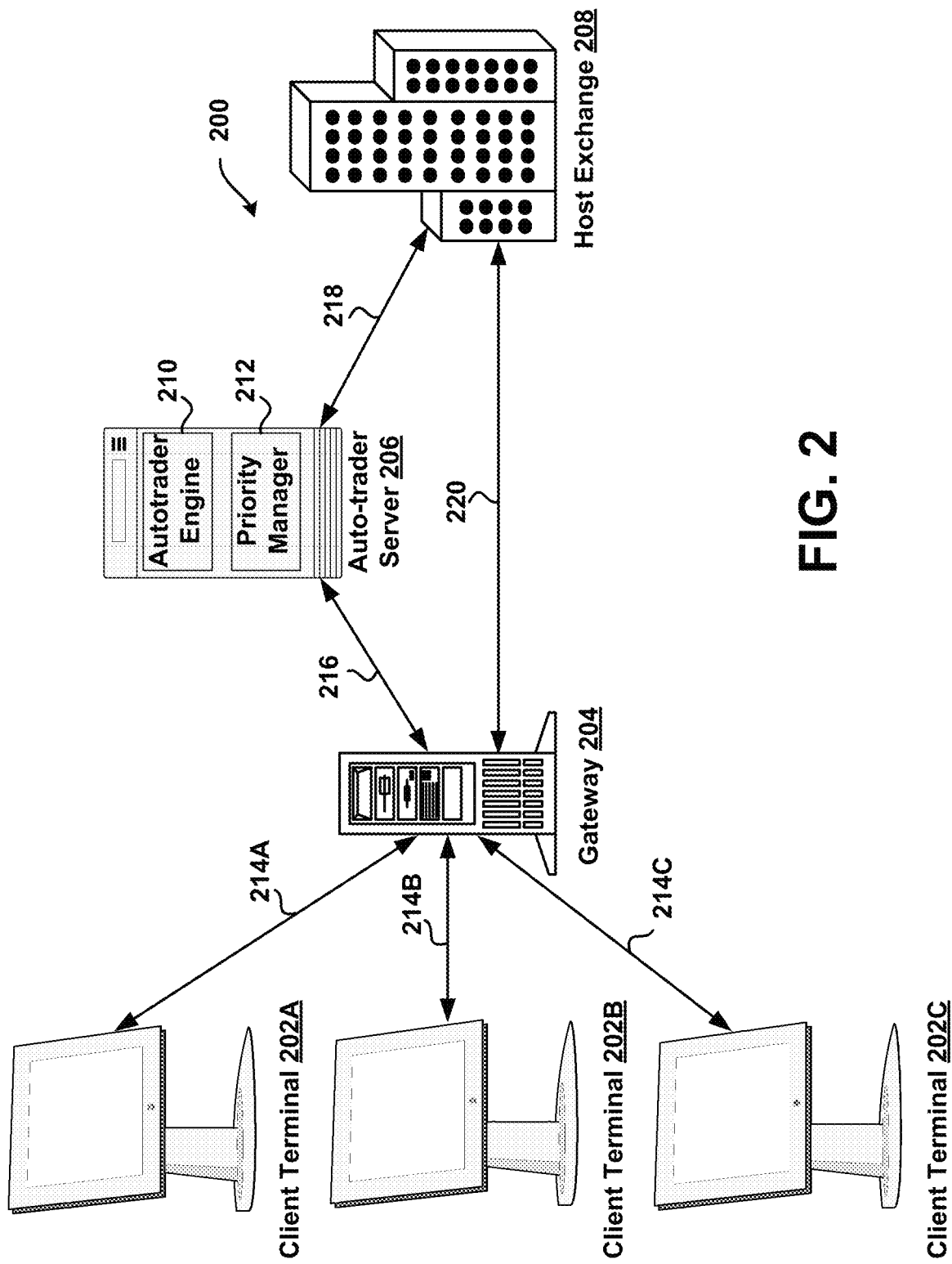
FIG. 2 is a block diagram illustrating an example embodiment of a system for prioritized automated trading.

FIG. 2 is a block diagram illustrating an example system 200 for server-based automated trading according to one example embodiment. The example system 200 shows multiple client terminals 202A-202C connected through communication links 214A-214C to a gateway 204. In one example embodiment, the gateway 204 may provide connectivity between the client terminals 202A-202C and an auto-trader server 206, as well as one or more host exchanges, generally illustrated as an exchange 208. While FIG. 2 illustrates client terminals sending profiles to the auto-trader server 206, in an alternative embodiment, other entities, such as black boxes having applications written to create and send trading profiles to the auto-trader server 206 could also be used. It should be understood that the black box trading applications could be used in addition to or instead of client terminals. Also, it should be understood that while FIG. 2 illustrates each client terminal being in communication with the auto-trader server 206, it is not necessary for the client terminals to be in communication with the auto-trader server 206 over the network for any purpose other than transmitting trading profiles. Further, alternatively, the profiles could be set up at the auto-trader server 206 via a web page, or yet some other means, so that there is no need for using any communication links between an entity sending the profiles and the auto-trader server 206.

In one example embodiment, the auto-trader server 206 could be a physical server, or could be a process or a set of processes that actually run anywhere else on the network. The auto-trader server 206 is preferably located in a close proximity to the host exchange 208. However, the auto-trader server 206 could be located anywhere on the network, ranging from running at the host exchange 208, at the gateway 204, or at the client terminals 202A-C, where the auto-trader functionality could be used to manage multiple auto-traders or multiple profiles being run by the auto-trader at the client terminal. Also, while FIG. 2 illustrates a single server to host auto-trader server 206, more than one server could also be used. According to this example, the auto-trader server 206 includes an auto-trader engine 210 that receives user-defined auto-trading rules, monitors market data, and reacts to market changes based on any user-defined auto-trading policies, the embodiments of which will be described in greater detail below. The auto-trader server 206 also includes a priority manager 212 that is configured with a number of priority rules to be used by the auto-trader engine 206 when two or more orders or any other requests are to be simultaneously sent to the host exchange 208, and the auto-trader 206 is to decide the order of sending them to the exchange 208.

In FIG. 2, the gateway 204 communicates with the auto-trader server 206 via a communication link 216 and with the exchange 208 via a communication link 220, while the server 206 communicates with the exchange 208 via a communication link 216. In such an embodiment, the gateway 204 may communicate any auto-trading requests to the auto-trader server 206 via the communication link 216, while other data may be communicated directly between the gateway 204 and the exchange 208 via the communication link 220.

It should be understood that the system configuration illustrated in FIG. 2 is only an example configuration, and different embodiments are possible as well. For example, the client terminals could communicate directly with the auto-trader server 206, and the auto-trader server 206 could then communicate any data to the exchange 208 via the gateway 204. Also, it should be understood that more than one server with an auto-trader engine could also be used, with some servers communicating directly with the client terminals, and others communicating with the client terminals via one or more gateways or other network entities.

Figure 3:
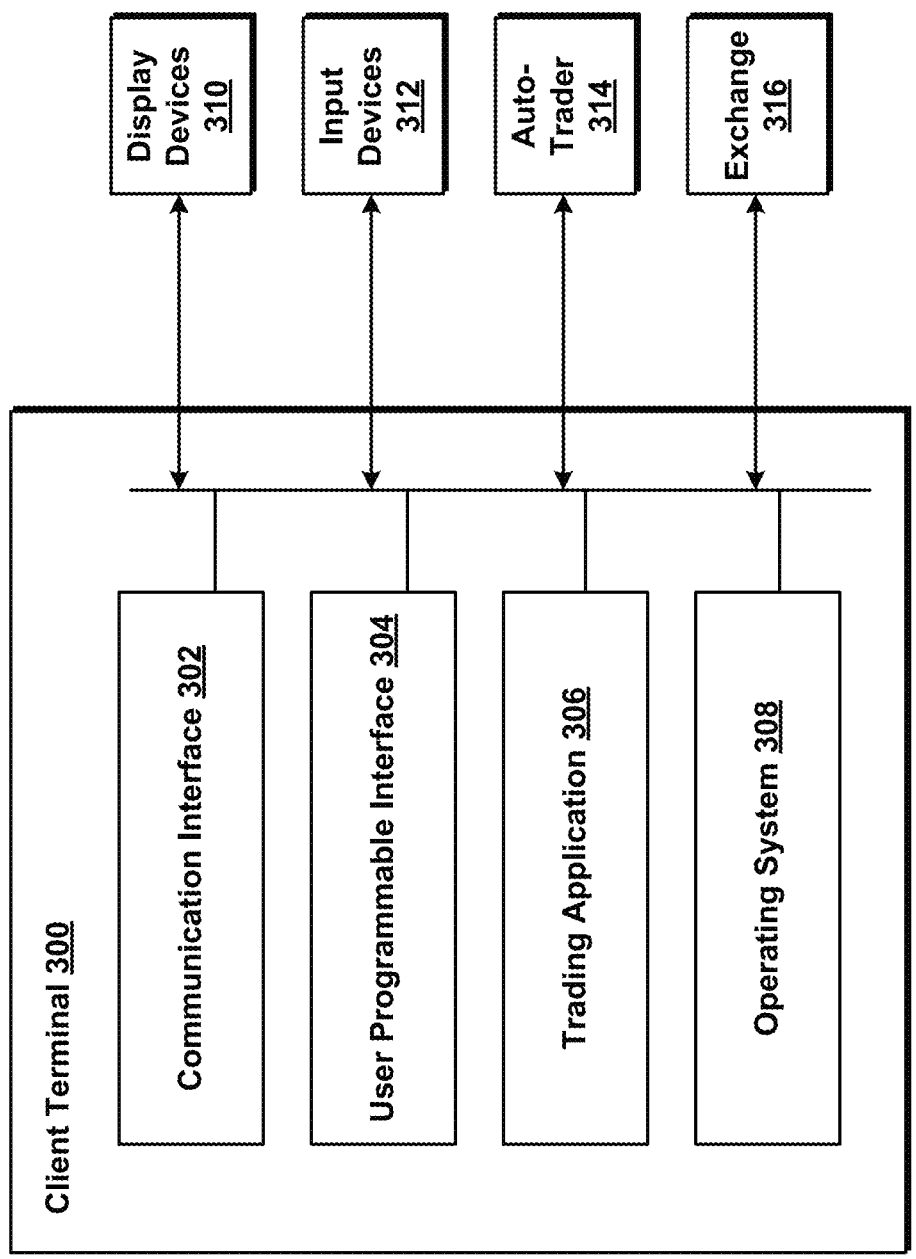
FIG. 3 is a block diagram of a client device with a number of layers defining different stages that can be used to implement the example embodiments.

FIG. 3 is a block diagram illustrating a client terminal 300 with a number of layers defining different stages that may be used to implement embodiments of the present invention. The layers include a communication interface 302, a user programmable interface 304, a trading application 306, and an operating system 308. The client terminal 300 also preferably includes, among other things, at least a processor and a memory unit (both of which are not shown in the figure, but are well known computer components). Preferably, the processor has enough processing power to handle and process various types of market information. Therefore, the more market information is received and processed, the more processing power is preferred. However, any present day processor has enough processing power to handle and process various types of market information. Also, it should be understood that a memory unit may include any computer readable medium. The term computer readable medium, as used herein, refers to any medium that participates in providing instructions to a processor unit for execution.

The communication interface 302 allows the client terminal 300, among other things, to interact with the trader and to generate contents and characteristics of a trade order to be sent to the exchange. The communication interface 302 also allows the client terminal 300 to interact with auto-trader 314. In one example embodiment, the user programmable interface 304 allows a user to develop a program to implement a trading strategy that is based on a set of specifications given by the user. The user programmable interface 304 may include any type of interface that allows the user to communicate with the auto-trader 314. For example, the user programmable interface 304 may be a command-driven interface, a graphical user interface that takes advantage of computer graphics, or the combination thereof. The graphical user interface may include one or more windows that can be moved around the display screen, and their size and shape can be changed as the user wishes. A window may in turn include icons that represent commands, files, or more windows. It should be understood that different types of user programmable interfaces could also be used. Alternatively, rather than using a user programmable interface at the client terminal, an intelligent communication interface could be used instead. In such an embodiment, a third party application could input one or more variables into the automated trader, and the auto-trader server could place orders into the market based on those variables.

In one embodiment, the user programmable interface 304 can be implemented in a software module or processor. The user programmable interface 304 can be a routine or a data structure, or the combination thereof, stored in a memory unit, and may perform the functions of the user programmable interface described herein.

As mentioned in an earlier paragraph, the user programmable interface 304 may take a format of an automated trader window, which may be displayed via the display devices 312 of the client terminal 300, such as a screen of the client terminal 300. The automated trader window 300 can include as many functional icons as the user requests, and each icon may include an image displayed on the screen to represent an element that can be manipulated by the user. In one example embodiment, a trader can turn on the auto-trader functionality by selecting one of the icons on the automated trader window, which may in turn result in the client terminal 300 sending a message to the auto-trader 314 to automatically implement the user-preconfigured profiles. Similarly, the trader could select another icon to turn off the auto-trader 314, which may in turn result in sending another message to the auto-trader 316. When the auto-trader 314 receives a message with a request to turn-off its functionality for a particular client terminal, the auto-trader 314 may automatically delete any orders currently pending at an exchange for a trader by sending one or more delete transaction messages to the appropriate exchange. The sequence of sending any delete transaction messages is preferably controlled by one or more priority rules preset on the auto-trader 314, the embodiments of which will be described in greater detail below.

The automated trader window could also allow a user to manually adjust his or her open position by a specific user-configurable amount. In another embodiment, a user could automatically adjust the user's open position by any amount, such as an amount given by a user. In yet another embodiment, a trader could input an instruction via the automated trader window to automatically reduce the user's open positions based on a hedged position in other products, or based on some other criteria.

It should be understood that different icons and order related data could be provided to a user as well. For example, a user could view a status, an activity level, account information, a position, and market information, such as market bid/ask quantity related data, a market bid/ask price level, or other information related to each preset order. The displayed icons could also include a "Delete Orders" icon, which, when selected by a user, may result in sending a message to the auto-trader 314, and the auto-trader 316 may attempt to delete any working orders at one or more electronic exchanges. It should be understood that a trader could view all pending orders via the user-programmable interface 304, and the trader could select which orders should be deleted by highlighting the orders on the screen, or via some other means.

Also, a trader could preferably add tradeable objects to the automated trader window by selecting them using a selection means, such as any menu-driven mechanisms, e.g., pull-down menus, drop-down menus, pop-up menus, and so on, command line entry mechanisms, check boxes that could be used to enable or disable different features or options, drag-and-drop, or yet different selection methods.

A trader can program any type of trading strategy to be implemented by the auto-trader 314. For example, a trader could develop an auto-trading profile, and the profile could characterize the user's particular trading strategy. A user could create as many profiles as he or she needs to accommodate any number of trading strategies. In one example embodiment, a trader could create a separate profile for each tradeable object. Preferably, the user can change profiles at any time before or while the user is trading. In one example embodiment, a trader could enter each profile via the user-programmable interface 304 and could view each profile on the automated trader window. In such an embodiment, a user could quickly select which of the preconfigured profiles should be used by the auto-trader 314. Alternatively, the auto-trader 314 could automatically select one of the saved profiles based on market conditions.

It should be understood that while the example embodiments for defining automated trading strategies are described herein in relation to client terminals, trading strategies could also be created programmatically via an API, by a programmer. In such an embodiment, a program could be executed to respond to market and other events and to make trading decisions without direct human intervention.

An auto-trading profile may include many different parameters. For example, the auto-trading profile may include a bid offset parameter, an ask offset parameter, a bid quantity to be entered into the market, an ask quantity to be entered into the market, and a maximum position that a trader is willing to hold at any given time for one or more tradeable objects. The bid offset value could be positive or negative, and could be subtracted or added to a base profile price, to indicate a price at which the user is willing to submit a buy order into the market. It should be understood that a profile could also include any user-configurable formulas. For example, a user could enter an equation that could be used by the auto-trader 314 to calculate a theoretical price at which a user wishes to have his orders entered for a particular tradeable object. It should be understood that there could be a separate theoretical sell price and a theoretical buy price. Also, a user could enter one or more conditions that have to be satisfied in order for the auto-trader 314 to send any orders to one or more exchanges.

Referring back to FIG. 3, the trading application 306 may display one or more trading interfaces to a trader via display devices 310, and the trading interface may allow a trader to view market data, enter, cancel, and view trade orders. Preferably, the trading application 306 has access to market information from one or more host exchanges 316, and allows a trader to view market data, enter and cancel order and view order related data. A commercially available trading application that allows a user to trade in systems like those shown in FIGS. 1 and 2 is X_TRADER® from Trading Technologies International, Inc. of Chicago, Ill. X_TRADER® also provides an electronic trading interface, referred to as MD Trader™, in which working orders and bid/ask quantities are displayed in association with a static price axis or scale. As mentioned above, the scope of the example embodiments described herein are not limited by the type of terminal or device used, and are not limited to any particular type of trading application. It should be understood that while FIG. 3 illustrates the auto-trader 314 and the trading application 306 as two different applications, the auto-trader 314 could be incorporated into the trading application 306, or vice versa.

Portions of the X_TRADER® and the MD Trader™-style display are described in U.S. Pat. No. 6,772,132 entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. patent application Ser. No. 10/125,894, entitled "Trading Tools for Electronic Trading," filed on Apr. 19, 2002, the contents of each are incorporated herein by reference.

The trading interface could provide an indication to a trader of what exactly is going on with any orders being handled by the auto-trader 314. For example, some cells on the trading interface could be highlighted or could change colors in response to the auto-trader 314 implementing the trader's trading strategy. Alternatively, a separate column/row could be provided in relation to the existing columns/rows, and the column could display visual indicators related to the actions being taken by the auto-trader 316. It should be understood that the indicators could take any user-configurable formats, and in addition to visual indicators, audio indicators could also be used. Also, the indicators could be displayed anywhere on a trading interface as long as the user is aware of the selected location and the purpose of each indicator.

The operating system 308 may be used to manage hardware and software resources of the client terminal 300. General functions of the operating system 308 may include processor management, memory management, device management, storage management, application interface, and user interface. Any type of the operating system 308 may be used to implement the present embodiments, and examples of common operating systems include the Microsoft WINDOWS® family of operating systems, the UNIX® family of operating systems, or the MACINTOSH® operating systems, or the LINUX family of operating systems. However, those ordinarily skilled in the art will recognize that the added complexity of an operating system may not be necessary to perform the functions described herein.

Figure 4:
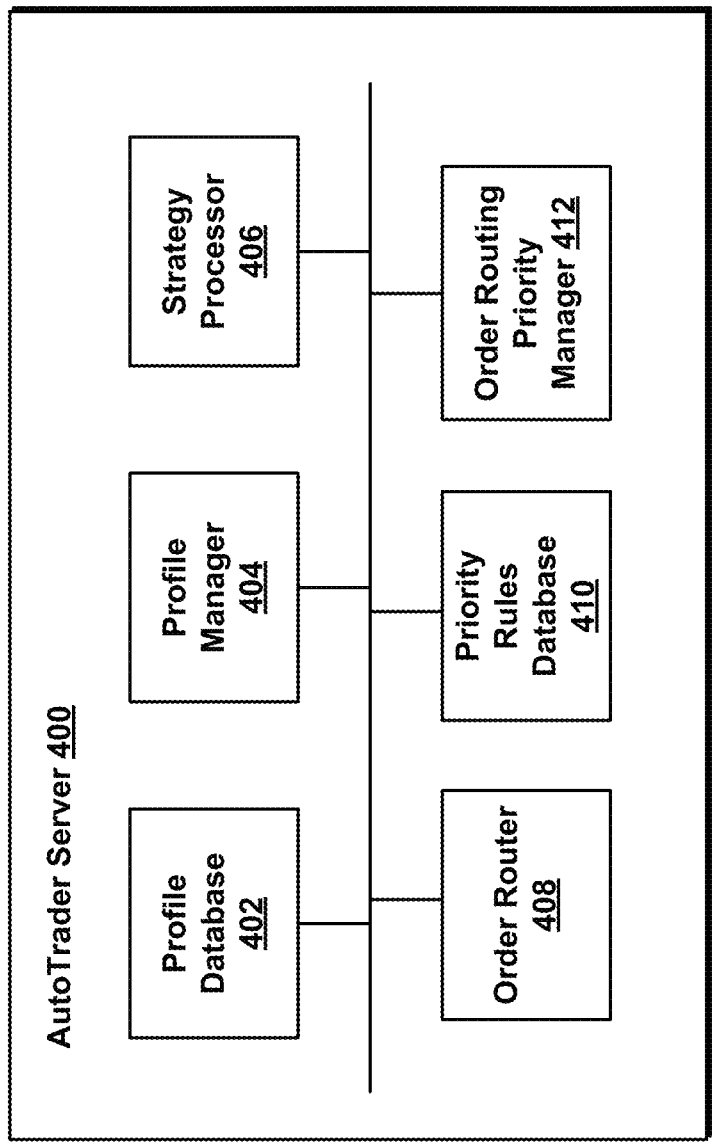
FIG. 4 is a block diagram of a network server with a number of layers defining different stages that can be used to implement the example embodiments.

FIG. 4 is a block diagram illustrating an example auto-trader server 400 with a number of layers defining different stages that may be used to implement the embodiments described herein. The layers include a profile database 402, a profile manager 404, a strategy processor 406, an order router 408, a priority rules database 410, and an order routing priority manager 412. The auto-trader also preferably includes at least a processor and a memory unit (not shown), both of which are well known computer components. Preferably, the processor has enough processing power to handle and process various types of market information and user requests.

The profile database 402 stores a plurality of profiles provided by a plurality of traders located at client terminals in communication with the auto-trader server 400. Alternatively, as mentioned in earlier paragraphs, the plurality of profiles could be received from black box trading applications, and traders could provide their profiles to the auto-trader server 400 via other means rather than the communication links. In one example embodiment, the profile database 402 may be automatically updated upon receiving any new information from one or more traders. It should be understood that a single trader could define more than one profile, and the profiles could be used by the auto-trader server 400 to implement that trader's trading strategy. The profile manager 404 may provide an interface that a trader can use to provide trading profiles to be stored in the profile database 402. It should be understood that the profile manager 404 and the profile database 402 could be combined into one application, and the profiles could also be stored in storage entities other than a database, including the main memory of the computer.

The strategy processor 406 may calculate order parameters, such as prices and quantities, based on the information being received from the profile manager 404 and the profile database 402. In one example embodiment, the strategy processor 406 may monitor data being received from one or more electronic exchanges, and then may use any trading rules in the profiles or other limitations specified in the profiles to determine whether an order should be submitted to one or more exchanges, or whether any other trading action should be taken, such as deleting existing orders, changing order quantities, or yet some other actions. The strategy processor 406 may also include other features that could be used to prevent sending orders to a market when the suggested buy order is priced at a price level that is higher than the market's best ask price, or prevents sending an order to a market when the suggested sell order is priced at a price level that is lower than the market's best bid price. It should be understood that different limitations are possible as well.

The order router 408 sends orders to one or more exchanges and interacts with the order routing priority manager 412 to determine when order related requests are to be sent from the auto-trader server 400 to one or more exchanges. In one example embodiment, the order routing priority manager 412 can access the priority rules database 410 to retrieve a number of preset rules configured for server-mediated automated trading. The order routing priority manager 412 preferably applies one of the preset rules when the strategy processor 406 determines that one or more messages or requests are to be simultaneously sent to an exchange. Using the rules, the order routing priority manager 412 may decide the order in which order related messages or requests will be sent to an exchange.

The order routing priority manager 412 may apply priority rules in relation to processing resources to be used for processing trading strategies or in relation to one or more network links to be used for sending any orders that result from processing the trading strategies. More specifically, when the auto-trader server 400 responds to a new event, it will perform a two step process for all registered auto-trading strategies: (i) determine what trading decision will be made according to its current state and any external input based on the trading profiles, and then (ii) send any order-related requests, if there are any, to one or more exchanges. In such an embodiment, priority rules can be applied to processing of the trading profiles, sending any order-related requests to one or more electronic exchanges, or the combination of steps. For example, based on the rules, the auto-trader server 400 can provide priority to one of the traders so that any detected event will be applied to that trader's trading profile first. Then, if any requests are to be sent for that trader, the auto-trader server 400 will send those requests to an appropriate exchange. When the auto-trader server 400 finishes processing and sending any order-related requests for the first trader, the auto-trader server 400 will process and send any order related request based on another strategy associated with the second highest priority trader, and so on. Alternatively, the auto-trader server 400 could process all registered trading strategies first, and then apply priority rules in relation to the step of deciding a sequence of sending order-related requests to one or more exchanges.

It should be understood that different embodiments could also be used to prioritize any order related data. For example, the auto-trader server 400 could first determine if any trading decisions should be made in relation to all trading strategies that are saved on the auto-trader server 400, and then can send any order related requests based on the priority rules. According to a different embodiment, auto-trading profiles could also be grouped based on some predefined criteria, such as based on a trading firm to which the traders belong. When the profiles are grouped, the auto-trader server 400 could process profiles for one group, and then send any order related request for that group of traders. Once one group of traders is processed, the auto-trader could process profiles and send any order related requests corresponding to the second group, and so on. In such an embodiment, any applicable priority rules could be used in relation to processing, sending, or both steps. Alternatively, different priority levels could be assigned to individual traders. In such an embodiment, one trader's strategies and order requests could be processed before any strategies corresponding to a trader assigned a lower priority level would be processed.

Yet, another processing level could be created at the individual trader level when an individual trader uses multiple trading strategies, and the strategies are configured so that they execute at the same time. In such an embodiment, the auto-trader server 400 could do all calculations in relation to all strategies corresponding to the trader, and then could send any order-related requests that result from processing the trading strategies. Also, it should be understood that within the second portion of the process, i.e., sending orders to an exchange, there could be multiple actions to be performed by the auto-trader server 400. In such an embodiment, further rules could be applied for setting priority level to the multiple actions.

Referring back to FIG. 4, the priority rules database 410 may include a number of user-configurable priority rules. An example set of order routing priority rules will be described hereinafter; however, it should be understood that different rules could also be used. Also, the rules could be combined to form multi-level rules, and different rules could be applied in relation to different tradeable objects. It should be understood that any rules being used by the order routing priority manager 412 could be dynamically changed during a trading day based on any administrator-defined triggers. For example, triggers could be based on market related data or some other dynamically determined data, such as a number of orders to be simultaneously sent for the same or different tradeable object, or yet some other triggers or the combination of triggers.

Also, trading strategies could be dynamically changed based on knowledge of other trading strategy decisions that are being made at approximately the same time. Such trading strategy changes could be used in relation to a number of traders that are part of the same trading group. For example, if the profile manager 404 detects that, according to one trading strategy, a large quantity buy order is to be sent at a certain price, it may change a quantity and or price of another buy/sell order to be sent in relation to the same tradeable object. The process of changing the strategy decision could be configured to be an intermediate phase between processing and sending order-related requests to an exchange. It should be understood that the embodiment described above are only illustrative, and different embodiments are possible as well. For example, more than one priority rule could be applied at the same time.

FIG. 5 is a block diagram illustrating a graphical interface 500 that could be used to select, define, and modify one or more order routing rules to be used by an order routing priority manager at an auto-trader server of the example embodiments.

In the embodiment illustrated in FIG. 5, the order routing priority rules 500 include a first registration priority rule 502. If the first registration rule 502 is selected, such as shown in FIG. 5, the auto-trader server may give priority to any order corresponding to a trader who was the first to register at the auto-trader server to auto-trade a specific tradeable object. Such a trader could be given priority with regard to reacting to changes in that tradeable object. Also, in such an embodiment, orders corresponding to another trader who was next to register at the auto-trader server would be processed next, and so on.

According to a second rule 504, the auto-trader server may use one or more algorithms that will randomize the assignment of priority level to any pending orders to be simultaneously sent to one or more exchange. Using the randomizing algorithms, the auto-trader server provides (over time) equal access to all traders. It should be understood that any randomizing algorithms could be used to randomize priority of the orders being sent to an exchange, and the example embodiments are not limited to any specific algorithm.

The auto-trader server could also use a round robin algorithm 506 to determine a priority level for each order to be sent to an electronic exchange. In such an embodiment, the auto-trader server could rotate orders in an order queue. For example, when the auto-trader server rotates orders, the auto-trader server could also limit an order quantity of the orders being submitted to an exchange based on an overall quantity pending in the order queue. For example, the auto-trader server could continuously compute an average order quantity corresponding to all pending orders to be simultaneously sent to an exchange. The auto-trader server could then limit an order quantity corresponding to each order being sent to the exchange to the average quantity value. In such an embodiment, if an order quantity corresponding to a first order in an order queue is higher than the computed average order quantity, the auto-trader server may lower the order quantity to the average order quantity, and an order having a remaining order quantity may be placed at the end of the order queue. It should be understood that the auto-trader could dynamically compute an average order quantity of all orders pending in an order queue every time a new order is to be submitted to an exchange. Alternatively, when the auto-trader server determines an average order quantity, the auto-trader server will not re-compute the average order quantity until the first round of orders that were used to compute the average order quantity is submitted to an exchange. It should be understood that different embodiments are possible as well.

According to another rule displayed in relation to the priority rules interface 500, the auto-trader server could apply a Highest Volume Order First rule 508 according to which an order having the highest order quantity will receive priority as compared to other orders with lower order quantities. For example, if there are three orders in an order queue, and the order quantities corresponding to the orders are 20, 25, and 22, the first order that will be sent to an exchange will be the one corresponding to the order quantity of 25, and then the auto-trader server will send orders corresponding to the order quantities of 22 and 20, in that sequence.

Rather than assigning priority to an order with the highest order quantity, another rule, a Smallest Volume Order First rule 510, could be used to give priority to an order with the lowest order quantity. In such an embodiment, the auto-trader server could dynamically determine which order in an order queue has the smallest order quantity, and that order will be sent first to an electronic exchange. The order of sending subsequent orders to the exchange could be determined in the same manner.

Some rules could also be based on trader-related data. For example, the Most Profitable Customer First rule 512 could be used to give priority to any orders associated with a trader who is considered the most profitable in a group of traders. In one embodiment, the auto-trader server can receive the profitability data from outside sources, and may use this data to decide the sequence of sending orders to an electronic exchange. For example, a trading firm can provide profitability data to the auto-trader server. Alternatively, the auto-trader server could compute a profit level for each trader based on orders being automatically submitted from the auto-trader server. It should be understood that the profit level could be computed based on a trader's performance during a single trading day or during a longer time period, and the time period to be used for the computations could be configured by a system administrator.

Another rule that could be used by the auto-trader server is a Calculate All First Then Send rule 514. If this rule is selected, the auto-trader server could first process all pending strategies based on any detected events, and then any order-related requests could be sent to one or more exchange.

According to another rule, a Most Recent Fill rule 516, the auto-trader server can give priority to an order associated with a trader whose activity level is high. For example, the auto-trader server could measure the activity level of a trader by determining a number of the most recent fills being received based on the trader's automatic trading strategy. In such an embodiment, a trader whose strategy is executing close to the market will benefit the most from the quickest send. Alternatively, rather than providing priority to orders corresponding to traders associated with the most recent fills or the highest number of fills, the auto-trader server could assign the highest priority to orders associated with traders who have been waiting the longest time to get their orders filled. Such an order routing priority method may be applied at the auto-trader server when a Least Recent Fill rule 518 is selected.

According to a Provided Priority rule 520, an exchange to which an order is to be sent, or some other regulatory agency may dictate different priority assignment rules to be applied at auto-trader servers. In such an embodiment, an auto-trader server may follow such preset rules when determining priority assignments. According to a Named-Trader rule 522, one named trader can get priority over another named trader. It should be understood that different routing priority rules could also be defined, and the example embodiments are not limited to the rules described above.

It should be understood that the example embodiments are not limited to the rules described above, and rules based on parameters different from those described above could also be used. For example, additional rules could consider risk and position related data associated with individual traders, a group of traders, or a trading firm. For example, a trader with a larger position typically represents a greater risk and could be given a higher priority on sending orders to manage that risk and position. Some rules could also be configured to prioritize orders coming from the same profile. For example, if a trader is holding a large position, and, based on a profile, the auto-trader server is to send a number of orders, it may first send orders that will reduce risk/position, such as order cancellations, quantity reduction requests, etc., before sending any orders that will increase risk/position.

Further, alternatively, additional rules could be based on profile-related actions itself, and some rules could be based on time elapsed since the last alteration of a trading profile. For example, a Most-Recent-Change-In-Profile rule and a Least-Recent-Change-In-Profile rule could be defined. The Most-Recent-Change-In-Profile rule can beneficial to a trader whose trading profile was not working as intended and has just been modified. If such a trader receives priority, he/she will be able to correct for any unintended trading behavior due to an incorrectly set up profile. The Least-Recent-Change-In-Profile rule can be beneficial to traders who set up their profiles correctly and don't require constant profile change.

In addition to any preset priority rules, a system administrator could also set up different rules to be used at the auto-trader server by selecting a Define Different Rules icon 524. When the icon 524 is selected, one or more graphical interfaces could be displayed, and a system administrator could use the interface(s) to create different rules. For example, the system administrator could enter formulas to be used by the auto-trader server to determine the order of sending a plurality of orders to an electronic exchange. It should be understood that the administration of all rules and making alterations to any preset rules could also be done automatically by a program operating under a set of meta-rules which observe triggers based on market movements, direction, volume, total risk and position size associated with a trader or a trading group, as well as any other conditions.

In another embodiment, a system administrator could also customize any existing rules by selecting an icon 526. For example, the system administrator could define different conditions to be used by the auto-trader server to determine which of the defined order priority rules should be selected to determine priority levels for sending orders to an exchange. Also, rather than applying one rule during the entire trading day, the system administrator could customize the existing rules so that the rules being applied by the auto-trader server can dynamically change during a trading day. In one embodiment, the system administrator could define one or more triggering conditions that could be used at the auto-trader server to determine which of the defined rules should be applied at any point in time during a trading session. It should be understood that the triggering conditions can take many different formats, and could be based on trader-related data, market related data, news, the combination thereof, or yet some other data types. When the system administrator is finished making all the changes, he or she can select an Apply selection icon 528 so that the newly selected or defined rules can be applied to any outgoing orders.

FIG. 6 is a flow chart illustrating a method 600 for server-based automated trading. It should be understood that each block may represent a module, segment, or portions of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. The flow diagram 600 will be described in relation to the elements of the auto-trader server in FIG. 4. However, it should be understood that more, fewer, or different components could also be used to execute the method 600.

At step 602, the strategy processor 406 detects an event that triggers a plurality of order-related actions associated with a trading strategy. According to one example embodiment, the strategy processor 406 may make that determination by detecting that one or more profile rules have been triggered based on market data being received from one or more exchanges, or based on some other user-defined data.

At step 604, the order routing priority manager 412 applies at least one order priority rule to determine priority levels in relation to the plurality of order related actions. As mentioned in earlier paragraphs, the order routing priority manager 412 may use the applicable priority rule(s) to determine which trading strategy should be processed first, and then send order-related requests corresponding to the strategy being processed before the next strategy is processed. Alternatively, all strategies can be processed first to determine if there are any order-related requests to be sent in relation to the processed strategies. Then, the order routing priority manager 412 may apply the applicable priority rule(s) to determine a sequence of sending order-related requests to one or more exchanges.

At step 606, the order router 408 processes the plurality of order-related actions based on the determined priority levels. In one example embodiment, the processing of order-related actions may include sending the plurality of order-related requests to the electronic exchange based on the priority level assigned to each order.

The example embodiments have been described in relation to a general software program that continuously monitors incoming data and applies priority rules to profile processing and/or order submission. However, rather than having the general software program constantly checking what it should do at every decision point, a custom program could be created, and the custom program could be a hard-coded representation of the current set of policy rules selected based on one or more detected event. Such a hard-coded representation could be generated using a method called "code-bursting" or "dynamic code generation." In such an embodiment, the auto-trader server could generate source code to accomplish a sequence of operations based on one or more detected events, and then dynamically compile the generated code, and execute it repeatedly.

The above description of the preferred embodiments, alternative embodiments, and specific examples, are given by way of illustration and should not be viewed as limiting. Also, many changes and modifications within the scope of the present embodiments may be made without departing from the spirit thereof, and the present invention includes such changes and modifications.

It will be apparent to those of ordinary skill in the art that methods involved in the system and method for prioritized automated trading may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A computer readable medium having executable instructions stored therein and including instructions executable to:

generate, by a client terminal, an order routing interface, wherein the order routing interface displays a plurality of routing priority rules corresponding to profiles stored in a profile database maintained remotely at an autotrader server in communication with the client terminal;

receive, by the profile database, a user selection corresponding to a smallest-volume priority rule applicable to a first profile for a first trading strategy including a first profile parameter for trading a first tradeable object and a second profile for a second trading strategy including a second profile parameter for trading a second tradeable object;

monitor, by a strategy processor of the autotrader server, in response to the profile database receiving the smallest-volume priority rule applicable to the first profile for the first trading strategy and the second profile for the second trading strategy, data for the first tradeable object and the second tradeable object;

calculate, by the strategy processor of the autotrader server, a first order parameter for the first trading strategy based on the first profile parameter specified by the first profile stored in the profile database and a second order parameter for the second trading strategy based on the second profile parameter specified by the second profile stored in the profile database;

determine, by the strategy processor of the autotrader server, that a first order-related message for the first trading strategy and a second order-related message for the second trading strategy stored in an order queue are to be sent to an electronic exchange substantially simultaneously;

determine, by an order routing priority manager of the autotrader server, a first order priority level for the first order-related message and a second order priority level for the second order-related message based on the received smallest-volume priority rule stored in a priority rules database of the autotrader server, wherein the first order priority level is based on a first quantity of the first order-related message and the second order priority level is based on a second quantity of the second order-related message;

compare, by the order routing priority manager of the autotrader server, the first order priority level associated with the first order-related message and the second order priority level associated with the second order-related message to determine an order queue priority, wherein the order queue priority is based on a smallest volume succession for sending the first order-related message and the second order-related message based on the received smallest-volume priority rule; and send, by an order router of the autotrader server, in response to determining the smallest volume succession by the order routing priority manager, the first order-related message and the second order-related message stored in the order queue according to the determined smallest volume succession.

2. The computer readable medium of claim 1, wherein the first profile parameter is one of: a bid offset, an ask offset, a bid quantity, and ask quantity, a maximum position, a user-configurable formula.

3. The computer readable medium of claim 1, wherein the second profile parameter is one of: a bid offset, an ask offset, a bid quantity, and ask quantity, a maximum position, a user-configurable formula.

4. The computer readable medium of claim 1, wherein the first tradeable object is at a first electronic exchange, wherein the second tradeable object is at a second electronic exchange.

5. The computer readable medium of claim 4, wherein the first electronic exchange is the same as the second electronic exchange.

6. The computer readable medium of claim 1, wherein the first order-related message is one of: a new order message, a cancel order message, and a change order parameter message.

7. The computer readable medium of claim 1, wherein the second order-related message is one of: a new order message, a cancel order message, and a change order parameter message.

8. The computer readable medium of claim 1, wherein the first quantity is a first total position quantity for a first trader and the second quantity is a second total position quantity for a second trader.

9. The computer readable medium of claim 1, further including instructions executable to:
dynamically modify, by a profile manager of the client terminal, the priority rule stored in the priority rules database.

10. The computer readable medium of claim 9, wherein the priority rule is dynamically modified based on an administrator-defined trigger.

11. The computer readable medium of claim 9, wherein the priority rule is dynamically modified based on market data.

12. The computer readable medium of claim 9, wherein the priority rule is dynamically modified based on a number of orders to be sent substantially simultaneously.

13. The computer readable medium of claim 1, wherein the priority rule is one of a plurality of priority rules combined to form a multi-level rule.

* * * * *